(12) United States Patent
Hillebrand et al.

(10) Patent No.: US 6,678,598 B1
(45) Date of Patent: Jan. 13, 2004

(54) DEVICE AND METHOD FOR SEAT SUPERVISION IN MOTOR VEHICLES

(75) Inventors: Matthias Hillebrand, Duisburg (DE); Bedrich Hosticka, Duisburg (DE); José Santos Conde, Duisburg (DE); Nenad Stevanovic, Bochum (DE); Andreas Teuner, Essen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/019,147
(22) PCT Filed: Jun. 24, 1999
(86) PCT No.: PCT/EP99/04388
   § 371 (c)(1),
   (2), (4) Date: May 3, 2002
(87) PCT Pub. No.: WO01/00459
   PCT Pub. Date: Jan. 4, 2001

(51) Int. Cl.[7] ............................................. G06F 7/00
(52) U.S. Cl. ..................... 701/45; 701/46; 180/268; 280/735
(58) Field of Search ............................. 701/45, 46, 47; 180/268, 271; 280/734, 735

(56) References Cited

U.S. PATENT DOCUMENTS 5,598,145 A * 1/1997 Shimotani et al. .......... 340/576
5,737,083 A    4/1998 Owechko et al. .......... 356/375

FOREIGN PATENT DOCUMENTS

DE    19757595 A1    7/1999
EP    0309927 A2    4/1989

OTHER PUBLICATIONS

Yadid–Pecht O. et al., "CMOS Active Pixel Sensor Star Tracker With Regional Electronic Shutter," *IEEE Journal of Solid–State Circuits*, vol. 21, No. 2, Feb. 1997.

* cited by examiner

*Primary Examiner*—Gertrude Arthur
(74) *Attorney, Agent, or Firm*—Glenn Patent Group; Michael A. Glenn

(57) ABSTRACT

A device for seat supervision in motor vehicles has a pulsed monochromatic light source for the short-time illumination of a supervised space. An image sensor array (ISA) is also provided for recording an image of the supervised space. The ISA is provided with a global electronic shutter unit which permits the illumination time of the ISA to be adjusted independently of a readout clock of the ISA. A synchronization unit for synchronizing the operation of the pulsed laser source and the ISA is provided. Also provided is a control unit for controlling the light source and the ISA so as to create a first image of the supervised space during illumination of the same at a first time and to create a second image of the supervised space without illumination of the same at a second time. Finally, a unit for creating a difference image from the first and second images is also provided.

9 Claims, 4 Drawing Sheets

DEVICE AND METHOD FOR SEAT SUPERVISION IN MOTOR VEHICLES

BACKGROUND OF THE INVENTION

1. Field of the Invention

The present invention relates to a device and a method for seat supervision in motor vehicles and in particular to a device vice and a method for optical seat supervision which are suitable able for controlling the activation state of one or more airbags.

2. Description of Prior Art

A centrally situated airbag should fire in the event of an accident if the seat is occupied by a person in the upright position. If a person bends forward too close to the airbag or if there is a child's seat or some other object on the seat, so that a person or a child could be injured or the airbag be triggered unnecessarily, this situation must be detected by a seat supervision system so as to prevent the airbag from firing or to modify the unfolding dynamics of the airbag.

The advantages of an airbag far outweigh potential disadvantages. However, an airbag can only provide protection with full efficacy if the occupant of the motor vehicle is belted up, so the airbag must be regarded as a supplementary unit of the so-called restrain system, SRS (SRS =Supplemental Restrain System). The airbag supports the restraining action of the belt in the event of a frontal collision and prevents direct impact of the thorax, neck and head with the dashboard.

An airbag normally fires 10 to 40 ms after the collision has occurred if the change in speed resulting from the collision exceeds a specified value, 25 km/h in Europe and 15 km/h in the USA. The airbag envelope then emerges from the airbag cover at a speed of 250 to 300 km/h. The time taken to inflate the airbag is 25 to 40 ms, which is faster than the eyelid reaction time. Only after this inflation time does the airbag provide its full protection. If, at the moment an accident occurs, an occupant is not in the normal sitting position, a situation which is referred to as OOP (Out of Position), or if there is a child's seat on the front passenger seat, the high acceleration rates during the unfolding phase of the airbag, which can be of the order of 100 G, can result in serious injuries, independently of whether the change of speed when the airbag is fired is low or high. Thus it is possible that the consequences of an accident which would not be that serious may be made worse. The airbag can only exhibit its full efficacy when the occupant is situated at a sufficient distance from the airbag cover. In the normal sitting position the distance between the driver's chest and the hub of the steering wheel is usually about 30 cm, whereas the distance between the front passenger's chest and the airbag cover is usually about 50 cm, the normal sitting positions varying according to the interior configuration of the vehicle.

In the field of technology dealt with here a plurality of methods for seat supervision in motor vehicles is already known by means of which airbag activation state control can be effected on the basis of seat supervision.

First of all, it is possible to deactivate and activate the airbag manually so as to avoid the chance of being exposed to danger by the airbag in certain special cases. However, with this approach it is easy to forget the need to activate the airbag. Using a pressure sensor arrangement to measure the weight exerted on a seat of the motor vehicle is a method which is often used to detect seat occupancy, the activation/deactivation of the airbag being effected on the basis of the measured weight. With this method, however, children's seats which weigh less than the weight threshold employed are not detected. Furthermore it is possible for the airbag to be activated unnecessarily if there is a load on the front passenger seat.

It is also possible to detect seat occupancy by performing a capacitive measurement of the object, usually a dielectric, which is situated between the seat and the instrument panel. For this purpose electrodes are located in the seat and in the instrument panel. With the aid of the permittivity measurement it is possible to detect the occupancy state of a seat, though an error-free distinction between a human being and an object will not generally be possible.

Also known is the practice of employing propagation time measurement methods using active signal sources, e.g. radar signal sources or laser light sources, to survey seat surfaces to obtain a "profile" for the occupancy evaluation.

Methods for children's seat detection are also known which are based on the use of special children's seats equipped with transponder technology. These transponders in the children's seats deactivate the airbag. With these methods based on transponder technology it is not, however, possible to detect either foreign children's seats or vehicle occupants.

From the article "Future Applications of Microsystem Technologies in Automotive Safety Systems" by P.Steiner and S.Schwehr, in Ricken/Gessner: Advanced Microsystems for Automotive Applications 1998, Springer Verlag Berlin, 1998, a passenger state detection method is known in which a person endangering zone immediately in front of an airbag is defined, this zone being supervised at various points by means of active monochromatic light sources (LEDs) and traditional CCD image sensors. When an occupant of the motor vehicle abandons the normal position, which is situated at a typical distance from an airbag module, and thus possibly comes too close to the airbag, the system described in the above article deactivates the airbag or reduces the firing power of the airbag. According to this publication the evaluation of the occupancy detection follows the triangulation principle, whereby the location of an object can be established from the position of a light spot in the image plane of a camera. The triangulation principle is known in this area of technology.

Another alternative method for selectively controlling airbag activation and deactivation is to define a person endangering zone immediately in front of the airbag and to supervise this zone with the aid of a light curtain or a light barrier. If the light curtain or the light barrier is interrupted, indicating that someone is in the danger zone, the airbag is deactivated.

The major problem with the above-cited optical methods for seat supervision using active light sources arises because of the extreme differences in illumination which can occur in a motor vehicle. The illumination can vary between 1 mlx on a dark night and 100 klx in direct sunlight. Especially in the case of simultaneous direct sunlight, the light beams emitted into a supervised space by active monochromatic sources can no longer be resolved. Furthermore, as a consequence of the statuary, country-specific safety regulations for guaranteeing the radiation safety of laser beams, the monochromatic light source may only emit a small amount of light energy.

SUMMARY OF THE INVENTION

It is the object of the present invention to provide a device and a method for seat supervision in motor vehicles which permit rapid detection of seat occupancy as a means of activating and deactivating an airbag under all illumination conditions.

According to a first aspect of the invention, this object is achieved by a device for seat supervision in motor vehicles which features a pulsed monochromatic light source for the short-time illumination of a space to be supervised. In addition an image sensor array for recording an image of the supervised space is provided which has a global electronic shutter unit which enables the illumination time of the image sensor array to be set independently of the readout clock of the image sensor array. Also provided is a synchronization unit for synchronizing the operation of the pulsed laser source and of the image sensor array. The device according to the present invention also has a control unit for controlling the light source and the image sensor array so as to create a first image of the supervised space during illumination of the same at a first time and to create a second image of the supervised space without illumination of the same at a second time. Finally, a unit is also provided to create a difference signal from the first and the second image.

The device according to the present invention is suited, on the one hand, to the use of the optical light section principle so as to determine the contour of an object on a seat under supervision and thus to identify the object on the seat. On the other hand the device according to the present invention is suited to determining the distance between a person or an object and an airbag, so that if a person suddenly makes a movement towards the airbag this can be deactivated if it is approached too closely. The preferred method here is to use a multizone investigation which permits power-adapted firing of the airbag.

The image sensor array of the device for seat supervision according to the present invention is preferably a CMOS/CCD image sensor with global shutter function which is affixed together with a monochromatic illumination source at a suitable location in the motor vehicle, e.g. in the rooflining, on the instrument panel or in the cowl. Global shutter function means that a shutter unit is provided which permits all the sensor elements of the sensor array to be shuttered electronically at the same time.

According to the present invention a scene is evaluated using difference image signals resulting from an image recorded with very short-time pulsed active illumination and an image recorded without pulsed illumination. The pulsed and the unpulsed image, i.e. the image without illumination by the light source, are recorded consecutively with minimal time lapse. The device according to the present invention thus operates substantially trouble-free even under extreme ambient conditions. Preferably an interference filter located in front of the image sensor array and which is tuned to the wavelength of the light beam emitted by the monochromatic illumination source can also be used so that a considerable part of the interfering light can also be suppressed.

The resolvable intensity differences in the difference image created in the present invention can subsequently be evaluated using conventional analysis methods employed in digital image processing and pattern recognition. Experience gained in the area of industrial measurement technology with light section systems under defined illumination conditions is particularly useful here. Triangulation methods are preferably employed to determine the distance of an occupant, if identified as such, from the airbag, the activation state of the airbag then being controlled on the basis of this distance determination.

According to a second aspect of the present invention, the above object is achieved by a method for seat supervision in motor vehicles wherein a supervised space is first illuminated by a pulsed monochromatic light source employing an illumination time in the microsecond or nanosecond range. During this illumination a first image of the supervised space is recorded by means of an image sensor array. A second image of the supervised space without illumination of the same by the light source is recorded a maximum of 10 ms before or after recording the first image. A difference image is then created from the first and second images.

The present invention is based on the finding that trouble-free seat supervision in motor vehicles can be achieved by using devices and methods which create a difference image from a first image recorded during an illumination and a second image recorded without illumination. For the creation of such a trouble-free difference image signal suitable for signal evaluation certain conditions must be met. First, short-time light pulses in the microsecond or nanosecond range must be used for the illumination so that the highest possible light power can be delivered with minimal light energy. In addition the time intervals between the images recorded with pulsed and unpulsed light must be as short as possible so as to minimize disturbances caused by object movement. Furthermore, globally synchronized illumination of the image sensor is essential in order to minimize movement fuzziness and the falsifications in the difference image signal which result therefrom.

In the device according to the present invention the above conditions can be realized through the use of an image sensor array with a global electronic shutter unit and a synchronization unit for synchronizing the operation of the pulsed light source and the image sensor array.

In known systems in the field of optical supervision technology, image recording methods using a continuous, active, structured illumination are employed. This makes it possible to achieve defined illumination conditions, a precondition for robust image evaluation. This approach is followed in multifarious areas of industrial image processing for shape testing and detection. In contrast, the present invention employs pulsed light sources with very short illumination times in combination with an image sensor array which permits sufficiently short global illumination times and which is synchronized with the active illumination source. This first makes it possible, even under extreme illumination conditions, to radiate the structured light emitted by the light source with an energy which permits the light reflected from an object to be detected despite the effect of sunlight without the injuries which may be caused by the light from laser sources or focused LEDs impinging directly on the eye. The combination of pulsed light sources with structured illumination and the use of an image sensor array, preferably a CMOS/CCD image sensor, with global shutter unit and variable integration times in the microsecond and nanosecond range, constitutes a particularly advantageous system for seat supervision which is e.g. suitable for controlling the activation state of an airbag.

By creating a difference image the present invention thus makes it possible to eliminate extraneous light effects in the form of direct sunlight, shadows, frontal light, street lighting and so on. Only the invisible, narrow-band near-infrared region of the light source contributes to the signal to be evaluated.

Further developments of the present invention are described in the dependent claims.

BRIEF DESCRIPTION OF THE DRAWINGS

Preferred embodiments of the present invention are described in more detail below making reference to the enclosed drawings, in which.

DESCRIPTION OF PREFERRED EMBODIMENTS OF THE INVENTION

Figure 1:
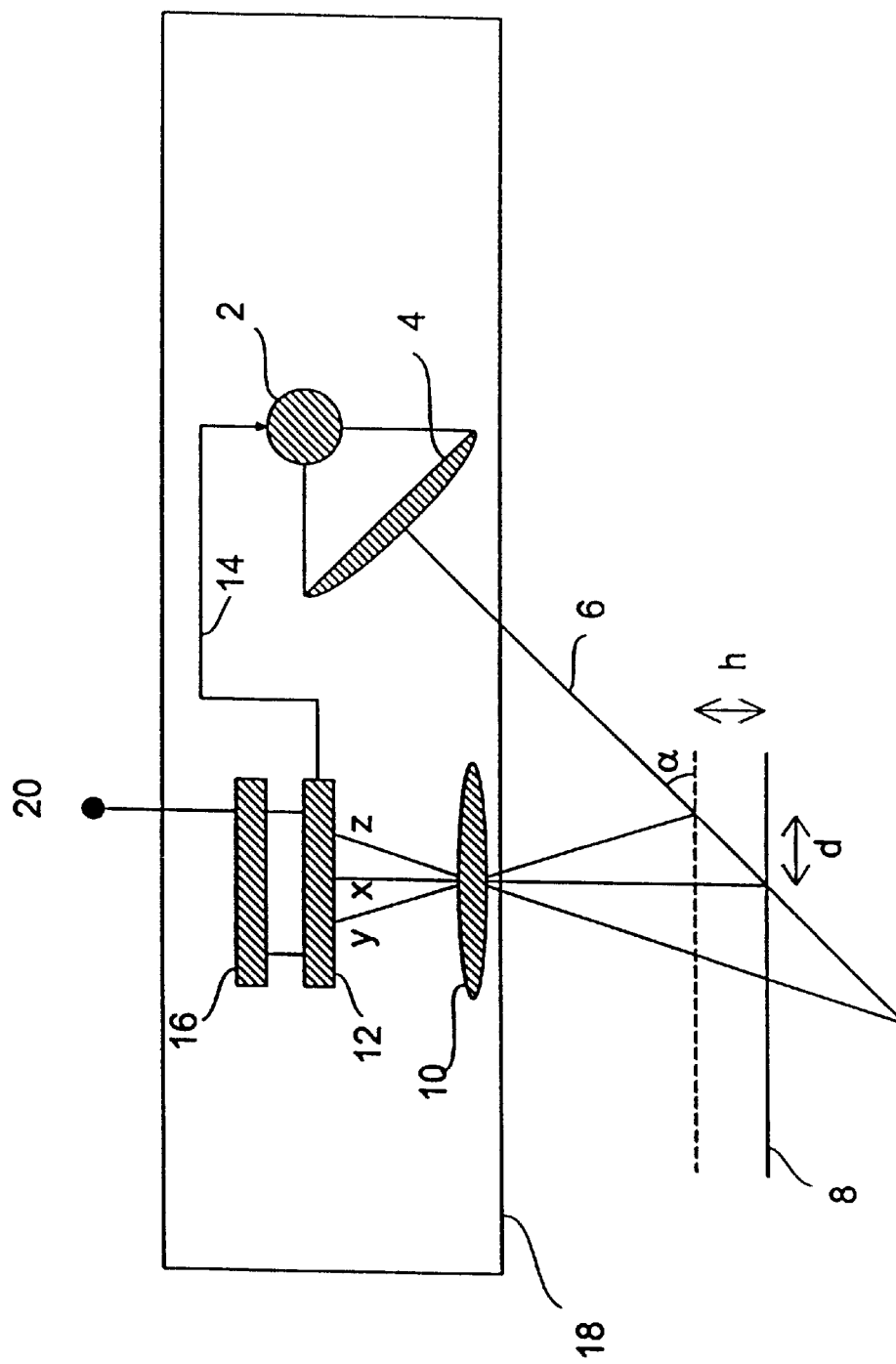
FIG. 1 shows a schematic representation of a device for seat supervision according to the present invention.

A device for seat supervision according to the present invention is shown schematically in FIG. 1, a light source being denoted by the reference numeral 2. The light source 2 is preferably a laser diode or LED, which preferably emits light in the invisible near-infrared range, 700 nm to 1100 nm. In the embodiment shown an optical unit 4 for forming a fan of light is arranged in front of the light source 2. The unit 4 is preferably a cylindrical optics unit or a diffraction grating.

The light beam 6 emitted by the light source 2 and the optional optical unit 4 impinges on an object, which is represented schematically by the continuous line 8, and is cast onto an image sensor array 12 by a receive optical unit 10. The image sensor array 12 is preferably a CMOS/CCD image sensor having a resolution of at least 128×128 pixels and which has a globally adjustable synchronous illumination time which can be controlled independently of the readout clock of the pixel values. This provides the possibility of illuminating even in the microsecond and nanosecond range. To achieve this short illumination time, the light source 2 is operated using very short pulses of a suitable length, the light source 2 and the image sensor array 12 being operated in synchronism, this being indicated schematically by the line 14. For this purpose an electronic control unit 16 is provided for the CMOS/CCD image sensor and the illumination source for synchronizable illumination. The electronic control unit can be realized either as an FPGA (Field Programmable Gate Array) or as an ASIC (Application Specific Integrated Circuit) or, alternatively, it can be integrated together with the image sensor array on an integrated circuit.

The electronic control unit 16, in conjunction with the image sensor array, which has a global electronic shutter unit via which the illumination time of the image sensor array can be adjusted independently of the readout clock of the image sensor array, makes it possible to record an image with illumination and an image without illumination which are separated by less than 10 ms. With the device for seat supervision according to the present invention it is therefore possible to record a scene with an image repetition rate of 100 to 1000 images/s, thus guaranteeing airbag control in the millisecond range. The time interval between the two recorded images referred to above, one with active illumination and one without active illumination, must lie below 10 ms in order that continuous movements in space do not lead to misinterpretations of the difference images which form the basis of the signal evaluation. The difference image can be formed directly on the CMOS/CCD image sensor chip or, alternatively, in a field programmable gate array, an application-specific integrated circuit, a microprocessor or a microcomputer. The unit for forming the difference can thus be part of the electronic control unit or can be implemented independently thereof.

In preferred embodiments of the device for seat supervision according to the present invention an interference filter is also provided, this being simply shown schematically in FIG. 1 where it is denoted by the reference numeral 18. The pass frequencies of the optional interference filter disk 18 are tuned to the wavelength of the light beam emitted by the monochromatic light source 2. Through this measure the interfering light can be suppressed still further. Although the interference filter disk 18 is located in front of both the image sensor 12 and the light source 2 in FIG. 1, it suffices as an option just to place it in front of the image sensor 12 or the receive optical unit 10. Furthermore, in preferred embodiments of the device for seat supervision according to the present invention a signal processing electronic unit is provided, indicated schematically in FIG. 1 by the connection 20, which serves to evaluate the difference image and to connect the signal which supplies information on the occupation of the seat to the airbag control unit.

The signal processing electronic unit uses the difference signals created by the image sensor array to perform both object recognition and also a distance measurement based on the triangulation principle, which will now be discussed briefly in terms of FIG. 1. The light source 2 projects a light beam 6 at an angle $\alpha$ into a scene in which there is e.g. an object 8.

This results in a light spot at the position x on the image sensor array if the object is situated at the distance indicated by the line 8. If the object is closer to the image sensor, it creates a light spot at the position y on the image sensor array, whereas if it is further away from the image sensor it creates a light spot at the position z on the image sensor array. Since the angles and distances of the light source and the image sensor in such a device are known, the distance of an object from the image sensor can be inferred by simple projection geometry from the position of the light spot created on the image sensor array 12, e.g. by using the formula $h = d \tan(\alpha)$.

Making reference to FIG. 2, an embodiment for an image sensor element of the image sensor array, preferably a CMOS/CCD image sensor, will now be described. Preferably an inexpensive camera system for high-speed cinematography with a sensor chip on the basis of standard CMOS technology is used as the image sensor. Such a system is cheaper than classical optomechanical or optoelectrical high-speed recording systems. In contrast to the fixed structures of CCD image elements, CMOS technology provides a flexible arrangement of image elements. Apart from the cointegration of signal readout and signal processing, many different functions can be realized on the chip. This also makes it possible to reduce the power loss and the manufacturing costs of the whole system.

The CMOS sensor for high-speed cinematography is preferably manufactured in a standard CMOS process with an n well depth of 1 $\mu$m with 128×128 pixels and has a linear transfer characteristic in respect of the incident light. The CMOS sensor has a global electronic shutter which permits simultaneous imaging in all the pixels. This global electronic shutter is needed in order to avoid any possible blurring caused by fast moving objects. This shutter also enables the illumination time and the readout clock to be completely divorced from one another.

Figure 2:
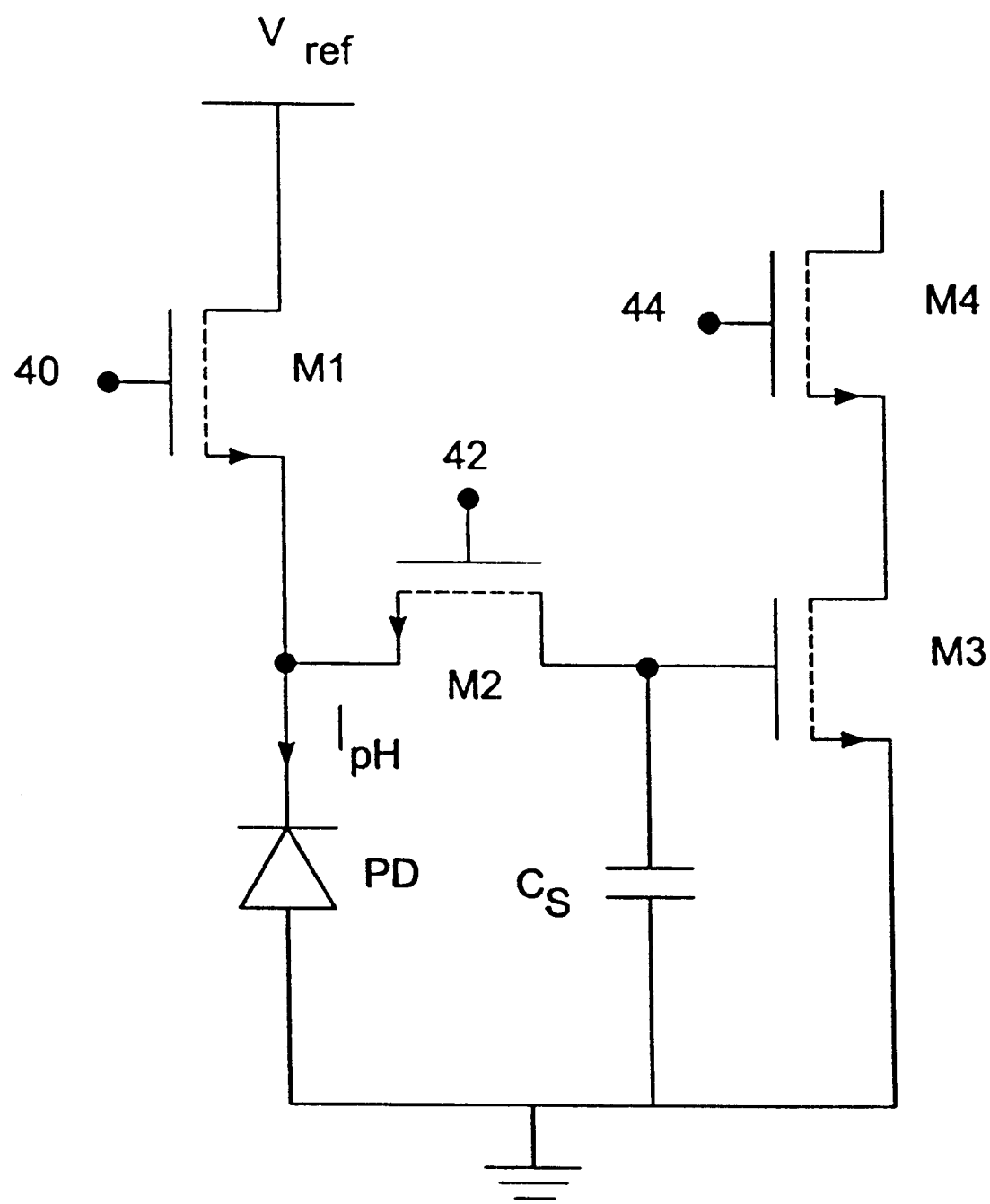
FIG. 2 shows a schematic circuit diagram of an image sensor element of an image sensor array of the device for seat supervision according to the present invention.

A sensor element of such a CMOS sensor, which represents a pixel, and employing a photoelement PD, is shown schematically in FIG. 2. In preferred embodiments of the present invention an $n^+$-diffusion-p-substrate photodiode is used as the photoelement PD because of its fast pulse response to the incident light. The cathode of the photodiode is connected to a reference voltage $V_{ref}$ via a reset switch M1 in the form of a transistor. The anode of the photodiode is grounded. Light impinging on the photodiode PD generates a photocurrent $I_{ph}$. The cathode of the photodiode PD is also connected via a shutter transistor M2 to a first terminal of a storage capacitor $C_s$, the second terminal of which is grounded. The storage capacitor $C_s$ is also connected via its first terminal to the transistors M3 and M4, which are provided to read out the charge stored on the storage capacitor $C_s$.

At the start of recording each and every image, global control signals (global in the sense that they are used for all the sensor elements) 40 (reset signal) and 42 (shutter signal) are set to a high level in each pixel so as to charge the storage capacitor $C_s$ up to the reference voltage $V_{ref}$. The transistors M1 and M2 function here as switches. After the storage capacitor $C_s$ has been charged up, the reset signal 40 is set to 0, whereupon the integration commences. Depending on the local distribution of the photocurrent caused by the external illumination, the storage capacitor $C_s$ is discharged in every pixel. The integration terminates when the shutter signal 42 is set to 0. The readout via the transistors M3 and M4 of the charge stored on the storage capacitor $C_s$ can now commence, the row-by-row readout being activated by setting a row-select signal 44 to high.

Such a CMOS sensor, and the complete camera system realized therewith, fulfill all the requirements of modern recording systems as regards high readout rates, i.e. more than 1000 images per second, no blurring, no blooming effects, very short illumination times and a linear transfer characteristic. These features are of essential importance, particularly for recording fast moving objects. This sensor is thus admirably suitable for seat supervision in motor vehicles by means of which timely control of the activation state of airbags can be achieved.

Figure 3:
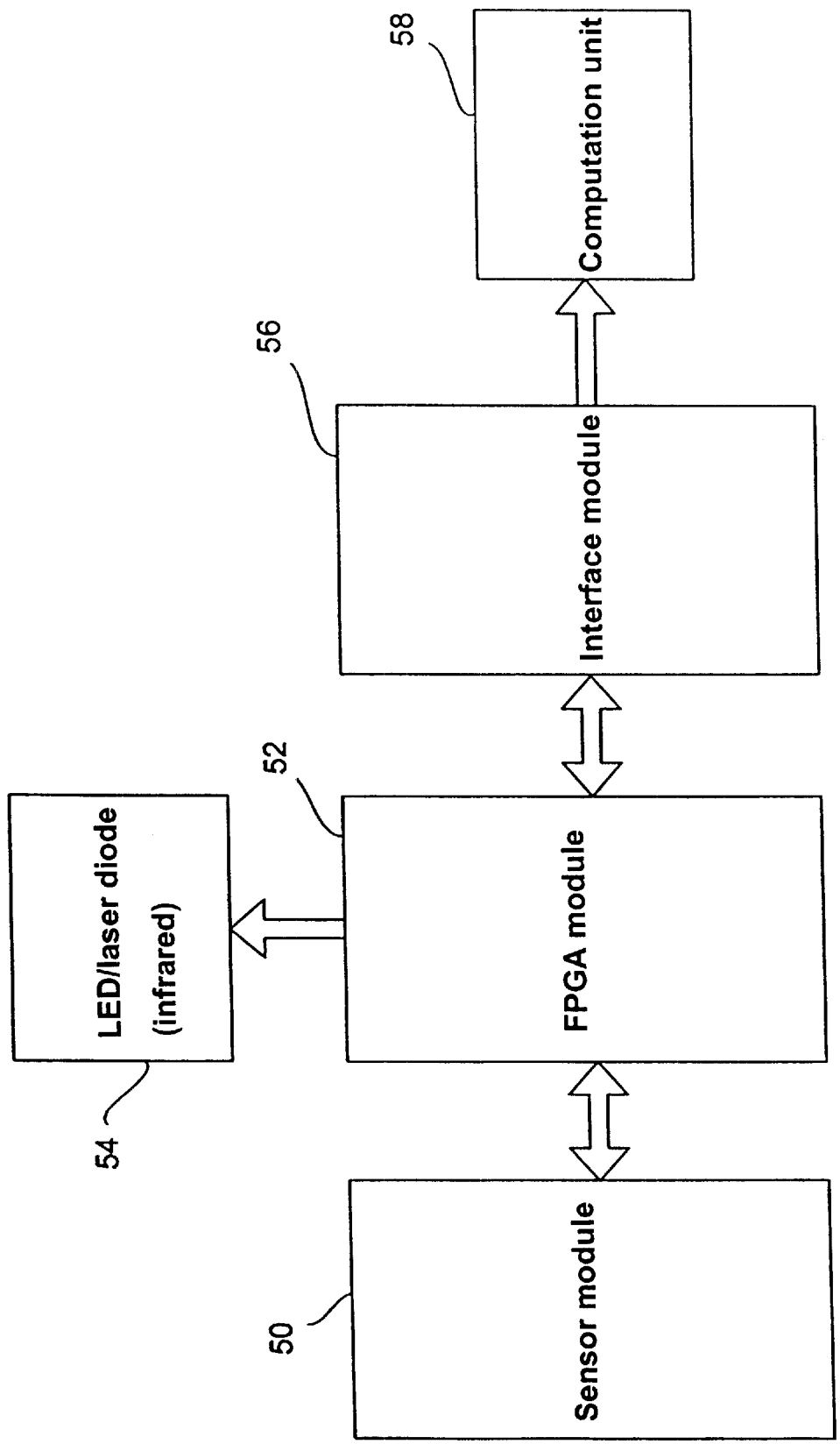
FIG. 3 shows a schematic representation of the device for seat supervision according to the present invention in which this device is used in a high-speed camera.

An image sensor array, which consists of a plurality, e.g. 128×128 pixels, of the image sensor elements shown in FIG. 2, constitutes the main component of a CMOS high-speed camera, the control or signal processing electronics of which can e.g. be realized in the form of an FPGA module, as can be seen in FIG. 3. In FIG. 3 the sensor module, shown schematically, is connected to the FPGA module 52, which is also connected to an LED/laser diode 54, which preferably operates in the invisible infrared range, so as to enable synchronous operation of the sensor module 50 and the light source 54. As explained above, the FPGA module preferably includes the electronic control unit of the seat supervision device. The FPGA module is preferably connected via an interface module 56 to a computation unit 58, which may preferably be a microprocessor or a microcomputer.

A preferred procedure for performing seat supervision by means of the computation unit 58 from the recorded image signals or difference signals will now be explained in more detail making reference to FIG. 4a) to 4c). This preferred procedure is based on the light section principle, using which it is possible to determine the contour of an object on the seat under supervision and thus to identify the object on the seat. This identification can be performed using methods of pattern recognition, so that e.g. a child's seat can be identified from the section image.

In addition it is possible from the section image to determine the distance of an object or a person from the airbag cover using the triangulation principle, which has been explained above. Using multizone supervision it can then be decided whether and how the airbag is to be activated in the event of a collision. Depending on the distance of the person from the airbag cover, a decision must be made as to whether the airbag is to be activated or deactivated, or whether the power of the airbag should be adjusted to match the distance which has been found or whether multistage switch-on is needed.

Figure 4:
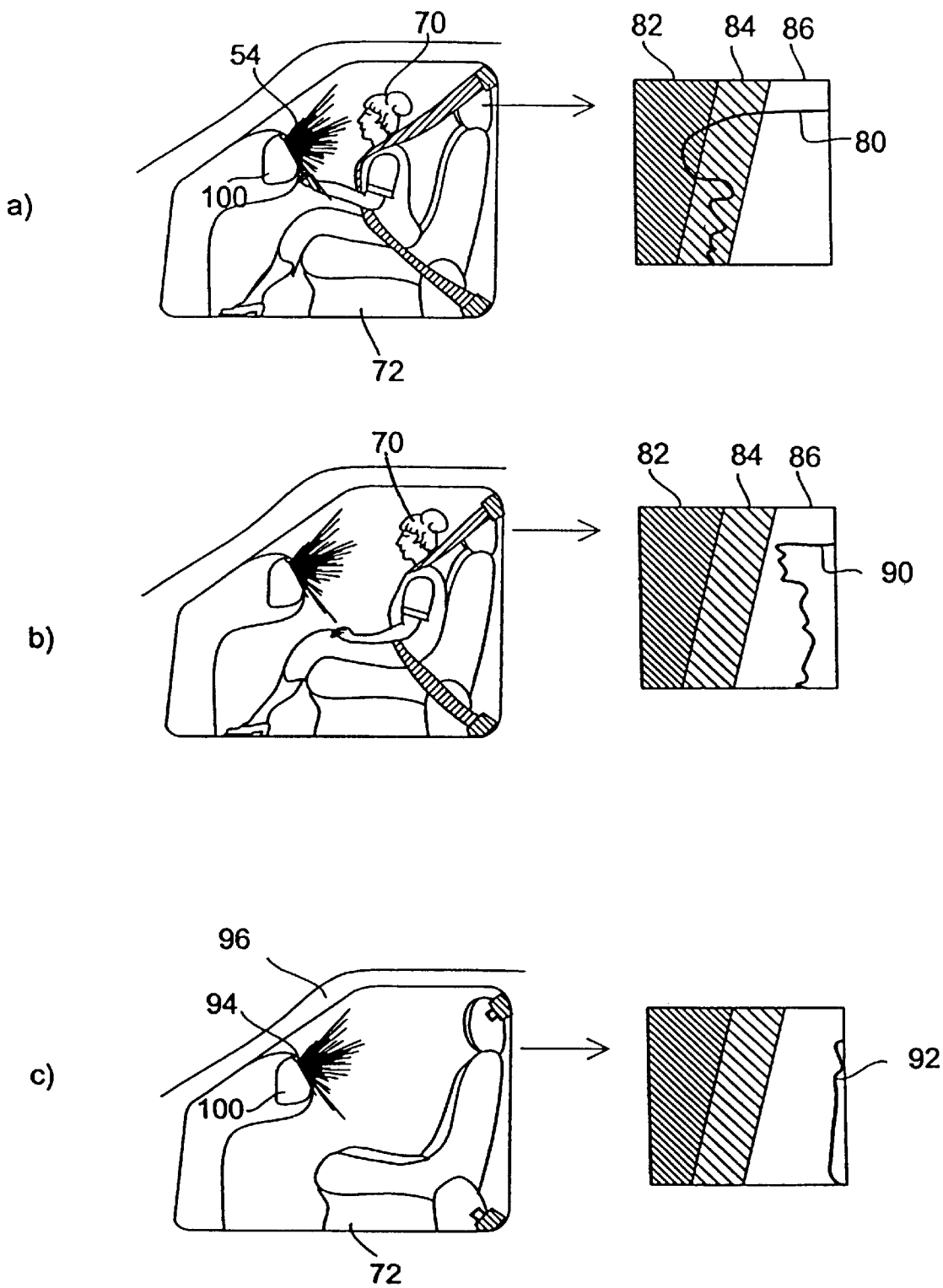
FIG. 4a) to c) show schematic representations elucidating the principle of optical seat supervision for airbag control.

This will now be explained in more detail making reference to FIG. 4a) to 4c). In FIG. 4a) a person 70 is shown sitting on the seat 72 of a motor vehicle and leaning forwards. The fact that the person is leaning forwards is registered by the seat supervision device according to the present invention. The fan of light from the light source 54 is represented schematically in each part of FIG. 4. The seat supervision device according to the present invention creates a light section, denoted by the reference numeral 80 in the right-hand part of FIG. 4a). As can be seen from the figure, the recording zone is divided into three sections, an airbag deactivation section 82, a section 84 for power-adjusted airbag firing, and an airbag activation section 86. In the situation represented in FIG. 4a) the seat supervision device therefore establishes that the occupant 70 is partly located in the airbag deactivation zone 82 and thus at too short a distance from the airbag 100. As a consequence the airbag is deactivated.

In FIG. 4b) the occupant 70 is shown in a normal sitting position, thus resulting in the section image 90 shown in the right-hand part of FIG. 4b). As can be seen, the section image is located completely in the airbag activation region 86, so that the airbag is activated normally so as to fire in the event of a collision. For the section images shown in FIG. 4a) and 4b) it is established by pattern recognition that in each case an occupant 70 is positioned on the seat 72 of the motor vehicle.

In FIG. 4c) the seat 72 of the motor vehicle is unoccupied. This results in the section image 92 shown in the right-hand part of FIG. 4c) and this can be evaluated by pattern recognition as revealing that the seat is unoccupied, so that the airbag 100 can be deactivated in all circumstances.

Possible positions, 94 and 96, where the seat supervision device according to the present invention may be located are shown in FIG. 4c). The measurement system of the seat supervision device according to the present invention, as has already been explained above, can be mounted at some suitable place in the motor vehicle, e.g. in the rooflining, on the instrument panel or in the cowl. In FIG. 4c) the instrument panel is denoted by the reference numeral 94 and the rooflining by the reference numeral 96.

To persons skilled in the art it is obvious that the device and the method according to the present invention can be used advantageously to perform airbag activation control in motor vehicles. It is important to realize that the system according to the present invention can be appropriately modified so as to construct a three-dimensional camera system which can supervise the complete interior of a motor vehicle, i.e. all the danger zones associated with the numerous airbags in a motor vehicle, e.g. the side airbags, and thus to control appropriately the activation state of the respective airbags.

What is claimed is:

1. A device for seat supervision in motor vehicles comprising:
   a pulsed monochromatic light source for the short-time illumination of a supervised space;
   an image sensor array for recording an image of the supervised space which has a global electronic shutter which enables the illumination time of the image sensor array to be adjusted independently of a readout clock of the image sensor array;

a synchronizer for synchronizing the operation of the pulsed light source and the image sensor array;

a controller for controlling the light source and the image sensor array so as to create a first image of the supervised space during illumination of the supervised space at a first time and to create a second image of the supervised space without illumination of the supervised space a second time; and a difference image former for creating a difference image from the first and the second image.

2. A device according to claim 1, wherein the illumination time of the light source lies in the microsecond or nanosecond range and wherein the first and the second times are at most 10 ms apart.

3. A device according to claim 1, further comprising an interference light filter, a pass frequency of which is tuned to a wavelength of the illumination light of the light source, in front of the image sensor array.

4. A device according to claim 1, wherein the light source is a laser diode or light emitting diode which emits light in an invisible near-infrared range and which is provided with cylindrical optics or a diffraction grating for forming a fan of light.

5. A device according to claim 1, wherein an evaluator for evaluating the difference image or a plurality of difference images is also provided so as to control the activation state of an airbag on the basis of the evaluation.

6. A device according to claim 5, wherein the evaluator evaluates the difference image or difference images using a triangulation method.

7. A method for seat supervision in motor vehicles, comprising the following steps:

a) illuminating a supervised space using a pulsed monochromatic light source employing an illumination time in the microsecond or nanosecond range;

b) recording a first image of the supervised space during the illumination in step a) using an image sensor array;

c) recording a second image of the supervised space, without illuminating the supervised space with the light source, a maximum of 10 ms before or after the first image; and d) creating a difference image from the first and the second image.

8. A method according to claim 7, which also includes the step of controlling an activation state of one or more airbags on the basis of one or more difference images.

9. A method according to claim 8, wherein a triangulation method is performed on the basis of one or more difference images so as to control the activation state of one or more airbags on the basis of the results of the triangulation method.

* * * * *